(12) United States Patent
Appuswamy et al.

(10) Patent No.: US 9,412,063 B2
(45) Date of Patent: Aug. 9, 2016

(54) TRANSFORM ARCHITECTURE FOR MULTIPLE NEUROSYNAPTIC CORE CIRCUITS

(71) Applicant: International Business Machines Corporation, Armonk, NY (US)

(72) Inventors: Rathinakumar Appuswamy, San Jose, CA (US); Myron D. Flickner, San Jose, CA (US); Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 14/142,616

(22) Filed: Dec. 27, 2013

(65) Prior Publication Data

US 2016/0155046 A1    Jun. 2, 2016

(51) Int. Cl.
| | | |
|---|---|---|
| G06F 15/18 | (2006.01) |
| G06N 3/04 | (2006.01) |
| G06N 3/063 | (2006.01) |
| G06N 99/00 | (2010.01) |

(52) U.S. Cl.
CPC .................. *G06N 3/04* (2013.01); *G06N 3/063* (2013.01); *G06N 99/005* (2013.01)

(58) Field of Classification Search
USPC ......................................................... 706/12
See application file for complete search history.

(56) References Cited

U.S. PATENT DOCUMENTS

| | | | |
|---|---|---|---|
| 6,073,154 A | 6/2000 | Dick |
| 8,234,431 B2 | 7/2012 | Kruglick |
| 8,914,315 B2 | 12/2014 | Modha |
| 8,990,130 B2 | 3/2015 | Alvarez-Icaza et al. |
| 8,990,616 B2 | 3/2015 | Alvarez-Icaza et al. |
| 8,996,430 B2 | 3/2015 | Modha |
| 9,020,867 B2 | 4/2015 | Esser |
| 9,053,429 B2 | 6/2015 | Alvarez-Icaza et al. |

(Continued)

FOREIGN PATENT DOCUMENTS

EP    2144174 A1    1/2010

OTHER PUBLICATIONS

A Digital Neurosynaptic Core Using Event-Driven QDI Circuits N. Imam; F. Akopyan; J. Arthur; P. Merolla; R. Manohar; D. S. Modha Asynchronous Circuits and Systems (ASYNC), 2012 18th IEEE International Symposium on Year: 2012 pp. 25-32, DOI: 10.1109/ASYNC.2012.12 IEEE Conference Publications.*
A digital neurosynaptic core using embedded crossbar memory with 45pJ per spike in 45nm P. Merolla; J. Arthur; F. Akopyan; N. Imam; R. Manohar; D. S. Modha Custom Integrated Circuits Conference (CICC), 2011 IEEE Year: 2011 pp. 1-4, DOI: 10.1109/CICC.2011.6055294 IEEE Conference Publications.*

(Continued)

*Primary Examiner* — Michael B Holmes
(74) *Attorney, Agent, or Firm* — Sherman IP LLP; Kenneth L. Sherman; Hemavathy Perumal (57) ABSTRACT

Embodiments of the present invention provide a method for feature extraction using multiple neurosynaptic core circuits including one or more input core circuits for receiving input and one or more output core circuits for generating output. The method comprises receiving a set of input data via the input core circuits, and extracting a first set of features from the input data using the input core circuits. Each feature of the first set of features is based on a subset of the input data. The method further comprises reordering the first set of features using the input core circuits, and generating a second set of features by combining the reordered first set of features using the output core circuits. The second set of features comprises a set of features with reduced correlation. Each feature of the second set of features is based on the entirety of said set of input data.

20 Claims, 10 Drawing Sheets

(56) References Cited

U.S. PATENT DOCUMENTS

| | | | |
|---|---|---|---|
| 9,087,301 B2 | 7/2015 | Alvarez-Icaza et al. | |
| 9,159,020 B2 | 10/2015 | Alcarez-Icaza et al. | |
| 9,160,617 B2 | 10/2015 | Alvarez-Icaza et al. | |
| 9,189,729 B2* | 11/2015 | Arthur | G06N 3/08 |
| 9,189,731 B2* | 11/2015 | Modha | G06N 3/08 |
| 9,195,903 B2* | 11/2015 | Andreopoulos | G06K 9/4676 |
| 9,218,564 B2* | 12/2015 | Arthur | G06N 3/063 |
| 9,239,984 B2* | 1/2016 | Arthur | G06N 3/049 |
| 9,244,124 B2* | 1/2016 | Alvarez-Icaza Rivera | G01R 31/318558 |
| 9,245,222 B2* | 1/2016 | Modha | G06N 3/04 |
| 9,245,223 B2* | 1/2016 | Modha | G06N 3/049 |
| 9,262,712 B2* | 2/2016 | Modha | G06N 3/02 |
| 9,269,042 B2* | 2/2016 | Friedman | G06N 3/049 |
| 9,269,044 B2* | 2/2016 | Akopyan | G06N 3/049 |
| 9,275,330 B2* | 3/2016 | Esser | G06N 3/063 |
| 9,292,788 B2* | 3/2016 | Modha | G06N 3/049 |
| 2011/0107060 A1 | 5/2011 | McAllister et al. | |
| 2016/0155045 A1 | 6/2016 | Appuswamy et al. | |

OTHER PUBLICATIONS

Building block of a programmable neuromorphic substrate: A digital neurosynaptic core J. V. Arthur; P. A. Merolla; F. Akopyan; R. Alvarez; A. Cassidy; S. Chandra; S. K. Esser; N. Imam; W. Risk; D. B. D. Rubin; R. Manohar; D. S. Modha Neural Networks (IJCNN), The 2012 International Joint Conference pp. 1-8, DOI: 10.1109/IJCNN. IEEE.*

Cognitive computing building block: A versatile and efficient digital neuron model for neurosynaptic cores A. S. Cassidy; P. Merolla; J. V. Arthur; S. K. Esser; B. Jackson; R. Alvarez-Icaza; P. Datta; J. Sawada; T. M. Wong; V. Feldman; A. Amir; D. B. D. Rubin; F. Akopyan; E. McQuinn; W. P. Risk; D. S. Modha Neural Networks (IJCNN), 2013 IEEE.*

Kimmel, M.J. et al., "Simultaneous Morphological Transforms of Interdependent Binary Images", IBM Technical Disclosure Bulletin, Nov. 1, 1990, pp. 340-343, vol. 33, No. 6B, IBM Corporation, USA.

U.S. Notice of Allowance for U.S. Appl. No. 14/142,609 mailed Apr. 4, 2016 by Examiner Michael B. Holmes.

* cited by examiner

$$P = \begin{pmatrix} I_{N/m} & 0 & 0 & 0 & 0 & 0 & 0 & & 0 & 0 & 0 \\ 0 & I_{N/m} & 0 & 0 & 0 & 0 & 0 & & 0 & 0 & 0 \\ \vdots & \vdots & \cdots & \vdots & \vdots & \vdots & \cdots & \vdots & \vdots & \vdots & \cdots & \vdots \\ 0 & 0 & 0 & 0 & I_{N/m} & 0 & 0 & & 0 & 0 & 0 \\ 0 & 0 & 0 & I_{N/m} & 0 & 0 & 0 & & 0 & 0 & 0 \\ \vdots & \vdots & \cdots & \vdots & \vdots & \vdots & \cdots & \vdots & & \vdots & \vdots & \cdots & \vdots \\ 0 & 0 & 0 & 0 & 0 & 0 & I_{N/m} & & 0 & 0 & 0 \\ \vdots & \vdots & \cdots & \vdots & \vdots & \vdots & \cdots & \vdots & & \vdots & \vdots & \cdots & \vdots \\ 0 & 0 & 0 & 0 & 0 & 0 & 0 & & 0 & I_{N/m} & 0 \\ 0 & 0 & 0 & 0 & 0 & 0 & 0 & & I_{N/m} & 0 & 0 \\ \vdots & \vdots & \cdots & \vdots & \vdots & \vdots & \cdots & \vdots & & \vdots & \vdots & \cdots & \vdots \\ 0 & 0 & 0 & 0 & 0 & 0 & 0 & & 0 & 0 & I_{N/m} \end{pmatrix}$$

TRANSFORM ARCHITECTURE FOR MULTIPLE NEUROSYNAPTIC CORE CIRCUITS

This invention was made with Government support under HR0011-09-C-0002 awarded by Defense Advanced Research Projects Agency (DARPA). The Government has certain rights in this invention.

BACKGROUND

The present invention relates to neuromorphic and synaptronic computation, and in particular, a transform architecture for multiple neurosynaptic core circuits.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neural module and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

One embodiment provides a method for feature extraction using multiple neurosynaptic core circuits including one or more input core circuits for receiving input and one or more output core circuits for generating output. The method comprises receiving a set of input data via the input core circuits, and extracting a first set of features from the set of input data using the input core circuits. Each feature of the first set of features is based on a subset of the set of input data. The method further comprises reordering the first set of features using the input core circuits, and generating a second set of features by combining the reordered first set of features using the output core circuits. The second set of features comprises a set of features with reduced correlation. Each feature of the second set of features is based on the entirety of said set of input data.

Another embodiment provides a neuromorphic system for feature extraction. The neuromorphic system comprises a first set of neurosynaptic core circuits for receiving a set of input data, extracting a first set of features from the set of input data, and reordering the first set of features. Each feature of the first set of features is based on a subset of the set of input data. The neuromorphic system further comprises a second set of neurosynaptic core circuits for generating a second set of features by combining the reordered first set of features. The second set of features comprises a set of features with reduced correlation. Each feature of the second set of features is based on the entirety of said set of input data.

These and other features, aspects and advantages of the present invention will become understood with reference to the following description, appended claims and accompanying figures.

DETAILED DESCRIPTION

Embodiments of the invention relate to neuromorphic and synaptronic computation, and in particular, a transform architecture for multiple neurosynaptic core circuits. One embodiment provides a neuromorphic system for feature extraction. The system utilizes multiple neurosynaptic core circuits for receiving input and generating a set of features with reduced correlation for the input received. For example, in one embodiment, the input received may comprise multiple input features. The system generates a set of features with reduced correlation for the input features.

The term electronic neuron as used herein represents an architecture configured to simulate a biological neuron. An electronic neuron creates connections between processing elements that are roughly functionally equivalent to neurons of a biological brain. As such, a neuromorphic and synaptronic computation comprising electronic neurons according to embodiments of the invention may include various electronic circuits that are modeled on biological neurons. Further, a neuromorphic and synaptronic computation comprising electronic neurons according to embodiments of the invention may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic computation according to embodiments of the invention can be implemented as a neuromorphic and synaptronic architecture comprising circuitry, and additionally as a computer simulation. Indeed, embodiments of the invention can take the form of an entirely hardware embodiment, an entirely software embodiment or an embodiment containing both hardware and software elements.

The term electronic axon as used herein represents an architecture configured to simulate a biological axon that transmits information from one biological neuron to different biological neurons. In one embodiment, an electronic axon comprises a circuit architecture. An electronic axon is functionally equivalent to axons of a biological brain. As such, neuromorphic and synaptronic computation involving electronic axons according to embodiments of the invention may include various electronic circuits that are modeled on biological axons. Although certain illustrative embodiments of the invention are described herein using electronic axons comprising electronic circuits, the present invention is not limited to electronic circuits.

In one embodiment, a neuromorphic system comprises a system that implements neuron models, synaptic models, neural algorithms, and/or synaptic algorithms. In one embodiment, a neuromorphic system comprises software components and/or hardware components, such as digital hardware, analog hardware or a combination of analog and digital hardware (i.e., mixed-mode).

Figure 1:
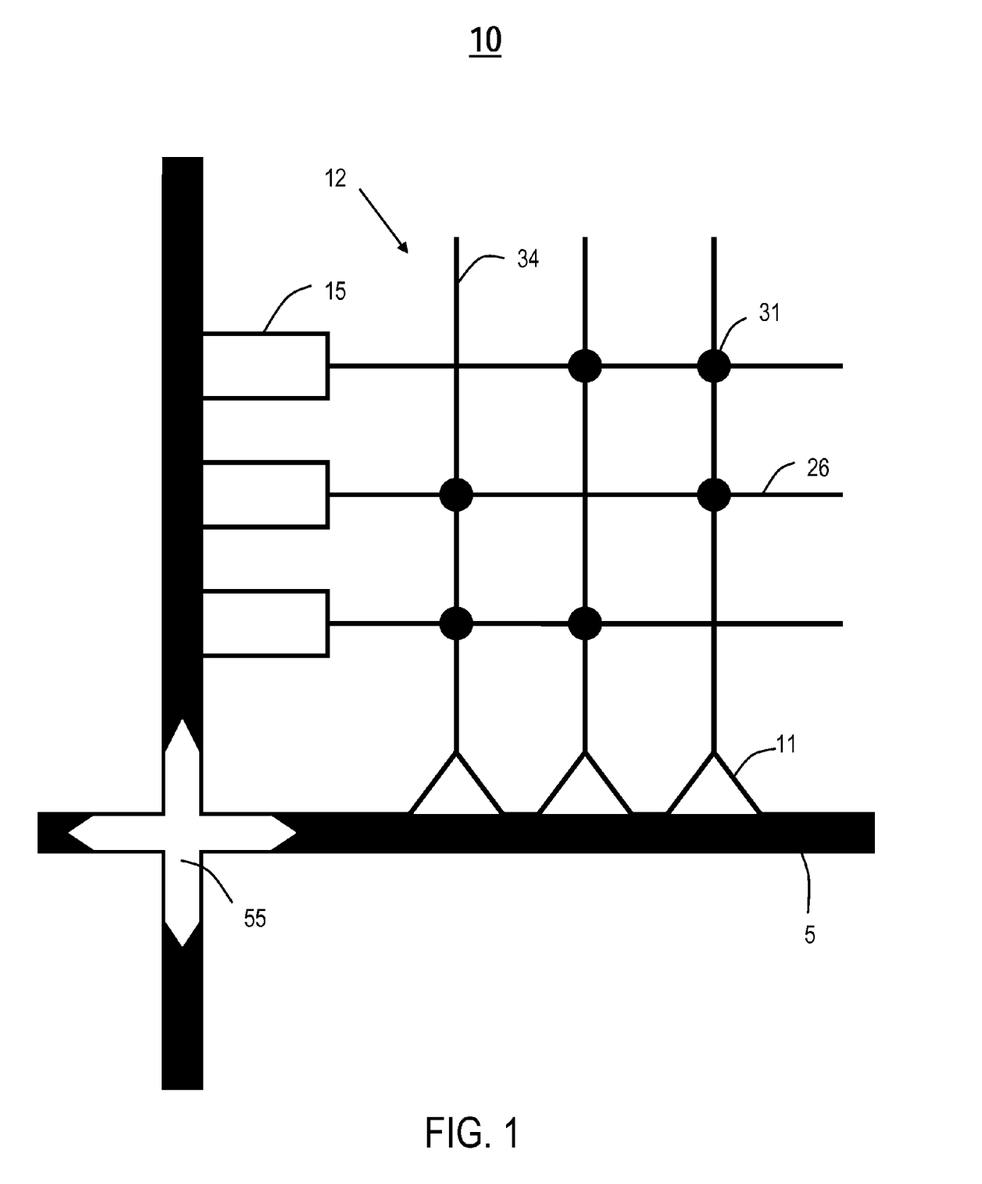
FIG. 1 illustrates an example neurosynaptic core circuit ("core circuit"), in accordance with an embodiment of the invention.

FIG. 1 illustrates an example neurosynaptic core circuit ("core circuit") 10, in accordance with an embodiment of the invention. The core circuit 10 comprises a plurality of electronic neurons 11 and a plurality of electronic incoming axons 15. The neurons 11 and the axons 15 are interconnected via an x×y synaptic crossbar 12, wherein x and y are integers greater than or equal to one. The crossbar 12 comprises multiple electronic synapse devices ("synapses") 31, multiple rows/axon paths 26, and multiple columns/dendrite paths 34.

Each synapse 31 communicates neuronal firing events (e.g., spike events) between an axon 15 and a neuron 11. Specifically, each synapse 31 is located at cross-point junction between an axon path 26 and a dendrite path 34, such that a connection between the axon path 26 and the dendrite path 34 is made through said synapse 31. Each axon 15 is connected to an axon path 26, such that said axon 15 sends firing events to the connected axon path 26. Each neuron 11 is connected to a dendrite path 34, such that said neuron 11 receives firing events from the connected dendrite path 34.

In one embodiment, each neuron 11 receives input (e.g., incoming neuronal firing events, input data) via interconnected axons 15 and, in response to the input received, generates output (e.g., outgoing neuronal firing events) according to a neuronal activation function.

Each synapse 31 has a synaptic weight. The synaptic weights of the synapses 31 is represented by an x×y matrix W, wherein x and y are positive integers. A learning rule such as spike-timing dependent plasticity (STDP) may be applied to update the synaptic weights of the synapses 31.

In one embodiment, the synapses 31 are binary memory devices. For example, the synapses 31 are implemented using 1-bit static random-access memory (SRAM) cells. Each synapse 31 has a synaptic weight equal to "0" or "1". In one embodiment, a synapse 31 with a synaptic weight "0" indicates that the synapse 31 is non-conducting. In another embodiment, a synapse 31 with a synaptic weight "0" indicates that the synapse 31 is not connected. In one embodiment, a synapse 31 with a synaptic weight "1" indicates that the synapse 31 is conducting. In another embodiment, a synapse 31 with a synaptic weight "1" indicates that the synapse 31 is connected.

In one embodiment, the neurons 11 are implemented using complementary metal-oxide semiconductor (CMOS) logic gates that receive incoming firing events and generate outgoing firing events according to a neuronal activation function. In one embodiment, the neurons 11 include comparator circuits that generate outgoing firing events according to a neuronal activation function. The outgoing firing events are delivered to target axons 15, wherein the target axons 15 may reside in the same core circuit 10 or somewhere else in a larger system with many core circuits 10.

As shown in FIG. 1, the core circuit 10 has a corresponding router 55. The router 55 is an up-down-left-right mesh router configured to receive incoming address-event router packets targeting axons 15 of the core circuit 10. In one embodiment, each incoming address-event packet includes an incoming neuronal firing event encoded as an address (e.g., an address represented as bits) representing a target axon 15 of the core circuit 10. The axons 15 of the core circuit 10 receive incoming address-event packet from the router 55 via one or more communication paths/channels 5 (e.g., a bus). The router 55 is also configured to send outgoing address-event router packets generated by neurons 11 of the core circuit 10. In one embodiment, each outgoing address-event packet includes an outgoing neuronal firing event encoded as an address (e.g., an address represented as bits) representing a target axon 15 of the same core circuit 10 or a different core circuit 10. The neurons 11 of the core circuit 10 send outgoing address-event packet to the router 55 via one or more communication paths/channels 5 (e.g., a bus).

Figure 2:
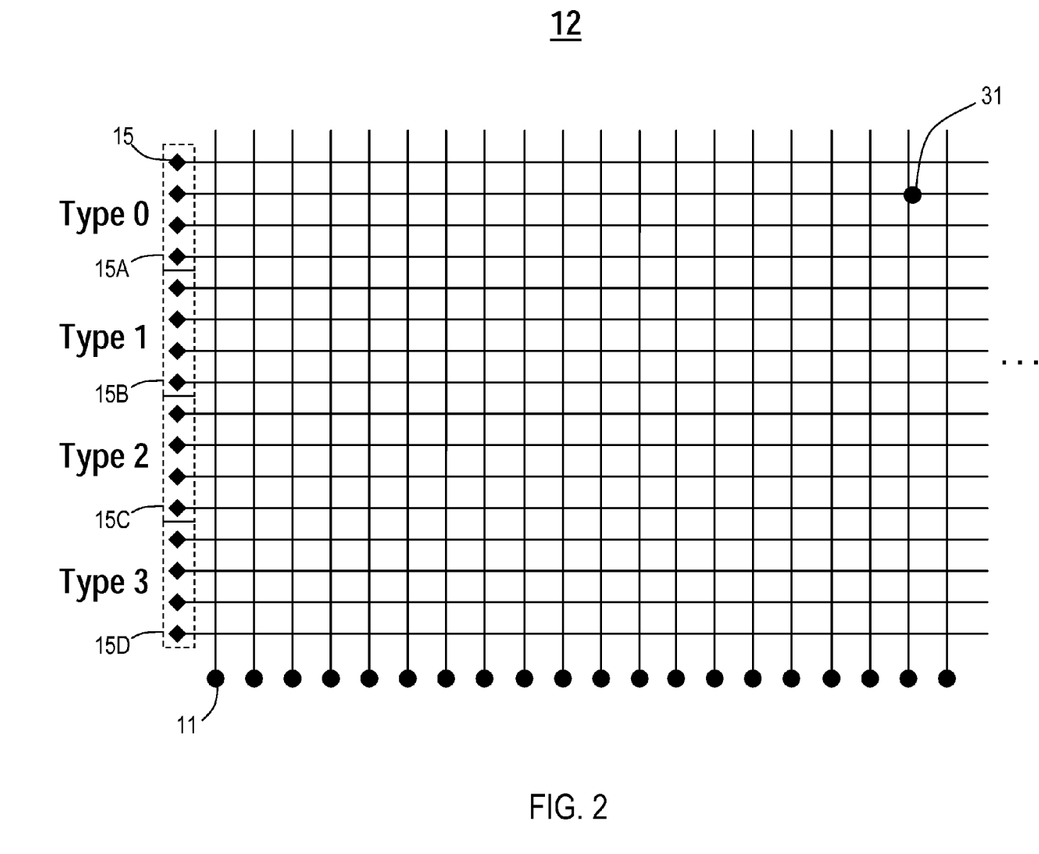
FIG. 2 illustrates a synaptic crossbar of a core circuit, in accordance with an embodiment of the invention.

FIG. 2 illustrates a synaptic crossbar 12 of a core circuit 10 (FIG. 1), in accordance with an embodiment of the invention. The core circuit 10 receives input (e.g., input data) via the axons 15 of the core circuit 10. In one embodiment, each axon 15 has a corresponding axon type Ty. For example, the axon type Ty may be one of the following: axon type Type 0, axon type Type 1, axon type Type 2, and axon type Type 3. Let $T_j$ denote an axon type of a $j^{th}$ axon 15 of the crossbar 12.

As shown in FIG. 2, the axons 15 of the core circuit 10 include a first axon group 15A comprising at least one axon 15 having axon type Type 0, a second axon group 15B comprising at least one axon 15 having axon type Type 1, a third axon group 15C comprising at least one axon 15 having axon type Type 2, and a fourth axon group 15D comprising at least one axon 15 having axon type Type 3.

The synaptic strength (i.e., connection strength) between a neuron 11 and an axon 15 may be modulated. Each neuron 11 has a corresponding effective synaptic strength for each axon type Ty. Let $S_{i,Tj}$ denote an effective synaptic strength between an $i^{th}$ neuron 11 of the crossbar 12 and a $j^{th}$ axon 15 having an axon type $Ty_j$. Let $W_{ij}$ represent a synaptic weight of a synapse 31 between the $i^{th}$ neuron 11 and the $j^{th}$ axon 15. When the $i^{th}$ neuron 11 receives input (e.g., an incoming neuronal firing event) from the $j^{th}$ axon 15, a membrane potential variable V of the $i^{th}$ neuron 11 is adjusted based on the effective synaptic strength $S_{i,Tj}$ and the synaptic weight $W_{ij}$.

Feature extraction is essential to efficiently process, learn and associate high-dimensional data. One embodiment of the invention provides a transform architecture for signal processing in a neuromorphic system comprising multiple core circuits 10. The transform architecture as described herein initializes synaptic connectivity information (e.g., synaptic weights and effective synaptic strengths) for each core circuit 10 of the neuromorphic system. The transform architecture also reduces average correlation for feature extraction, thereby enabling the extraction of a set of features with reduced correlation.

Figure 3:
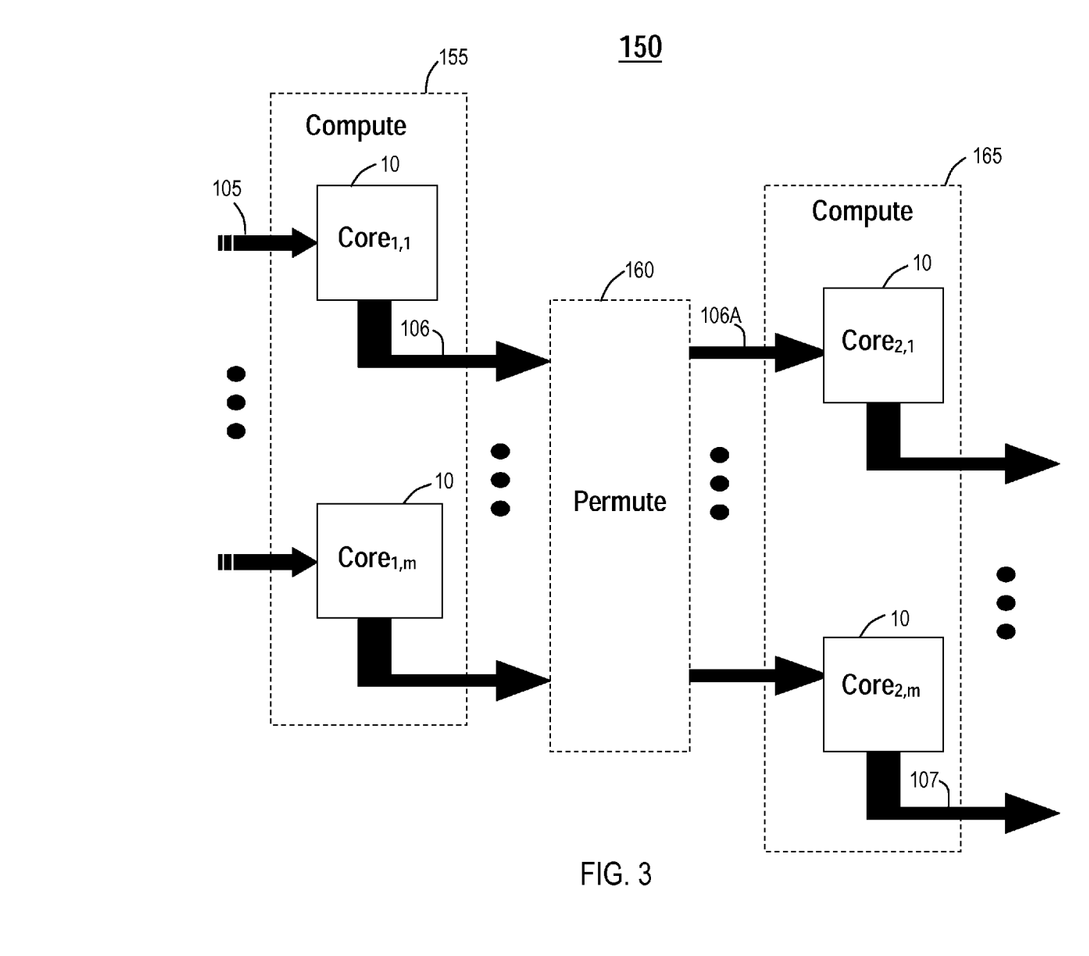
FIG. 3 illustrates an example transform architecture for multiple core circuits, in accordance with an embodiment of the invention.

FIG. 3 illustrates an example transform architecture 150 for signal processing in a neuromorphic system comprising multiple core circuits 10, in accordance with an embodiment of the invention. The core circuits 10 of the neuromorphic system may be used for feature extraction. In one embodiment, the transform architecture 150 is a compute-permute-compute architecture including a first compute phase 155, a permutation phase 160, and a second compute phase 165.

The core circuits 10 of the neuromorphic system are divided between the first compute phase 155 and the second compute phase 165. Each compute phase 155, 165 includes m core circuits 10, wherein m is a positive integer. The permutation phase 160 does not require additional core circuits 10. As shown in FIG. 3, the first compute phase 155 includes m input core circuits 10 for receiving input, such as input core circuits $Core_{1,1}, \ldots,$ and $Core_{1,m}$. The second compute phase 165 includes m output core circuits 10 for outputting a set of features based on input received by the input core circuits 10. As shown in FIG. 3, the second compute phase 165 includes output core circuits $Core_{2,1}, \ldots,$ and $Core_{2,m}$. Therefore, the transform architecture 150 utilizes a total of 2m core circuits 10.

Input 105 (e.g., incoming neuronal firing events, input from a different feature extraction layer, sensory inputs from external sensors, etc.) are assigned to axons 15 of the input core circuits 10. A neuron 11 generates an output (e.g., an outgoing neuronal firing event) when a membrane potential variable V of the neuron 11 reaches a pre-determined threshold value Th. In the permutation phase 160, output 106 generated by neurons 11 of the input core circuits 10 are permuted/reordered and routed, as permuted/reordered input 106A, to axons 15 of the output core circuits 10. Neurons 11 of the output core circuits 10 generate output 107 (e.g., outgoing neuronal firing events) from the permuted/reordered input 106A. The output 107 may be provided to classifiers or other feature extraction layers.

In one embodiment, the input 105 comprises a set of input data. The output 106 generated by the input core circuits 10 comprises a first set of features that the input core circuits 10 extracted from the set of input data. Each feature of the first set of features is based on a subset of the set of input data. In one example implementation, the first set of features represents local features/characteristics (e.g., local characteristics for a portion of an input image). The input core circuits 10 then permute/reorder the first set of features. The permuted/reordered first set of features are routed as the permuted/reordered input 106A to the axons 15 of the output core circuits 10.

In one embodiment, the transform architecture 150 reduces average correlation for feature extraction. The output core circuits 10 generate as the output 107 a second set of features, wherein the second set of features comprises a set of features with reduced correlation. The output core circuits 10 generate the second set of features with reduced correlation by combining the permuted/reordered first set of features. Each feature of the second set of features is based on the entire set of input data. In one example implementation, the transform architecture 150 minimizes average correlation for feature extraction such that the set of features extracted is a maximally uncorrelated set of features.

In one embodiment, feature extraction comprises reducing correlation between features. The input 105 may comprise a set of input features, and the transform architecture 150 reduces average correlation of the set of input features, such that the output 107 comprises a set of features with reduced correlation for the set of input features. In one example implementation, the transform architecture 150 minimizes average correlation for the set of input features such that the output 107 is a decorrelated set of features for the set of input features.

In one embodiment, each core circuit 10 includes a built-in router for permuting outgoing neuronal firing events generated by the neurons 11 of the core circuit 10. For example, the router 55 of a core circuit 10 may be further configured to permute output neuronal firing events generated by the neurons 11 of the core circuit 10.

As described in detail later herein, the crossbar 12 of each core circuit 10 is implemented (i.e., constructed) based on a corresponding transform. A transform corresponding to a core circuit 10 may be used to initialize synaptic connectivity information for the core circuit 10, such as synaptic weights and effective synaptic strengths.

Figure 4:
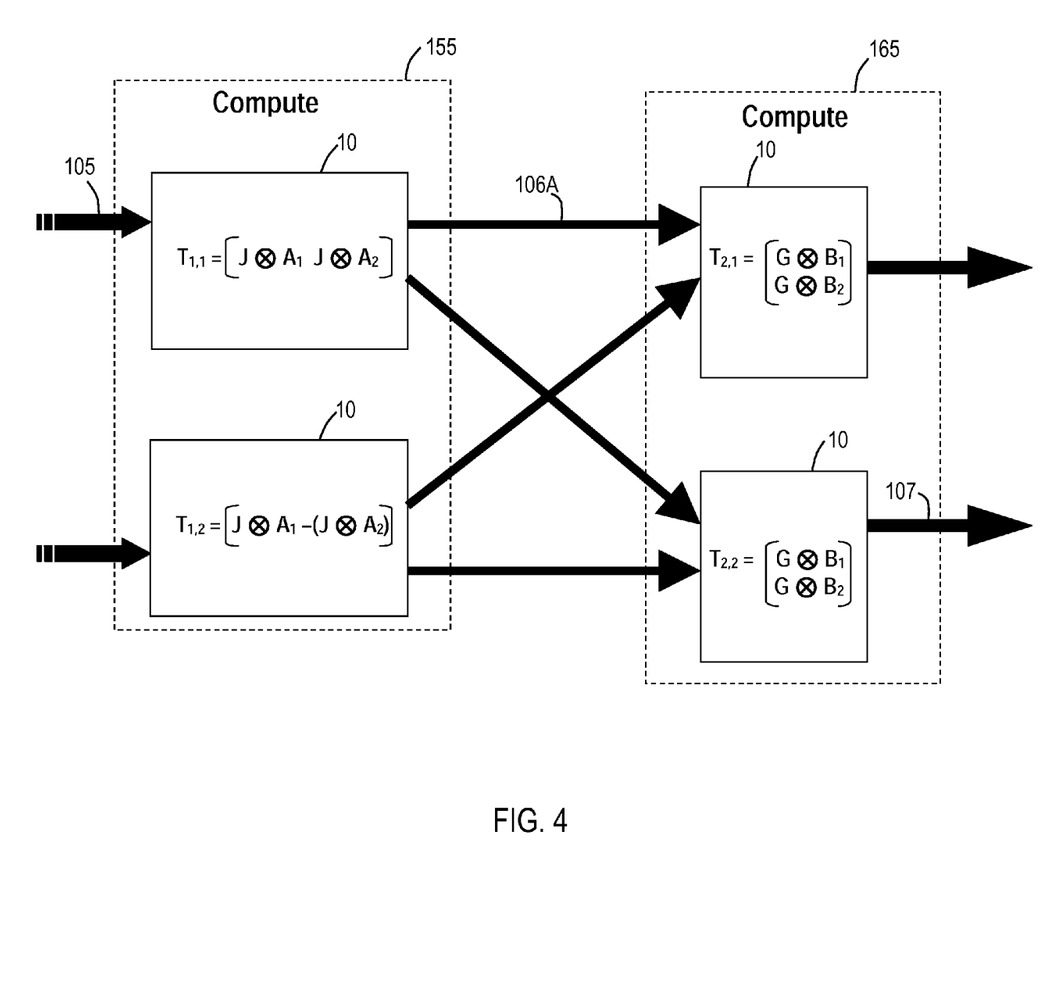
FIG. 4 illustrates example transforms for each compute phase of the transform architecture in FIG. 3, in accordance with an embodiment of the invention.

FIG. 4 illustrates example transforms for the input core circuits 10 and the output core circuits 10 in FIG. 3, in accordance with an embodiment of the invention. Let $T_{1,i}$ denote a transform corresponding to an input core circuit $Core_{1,i}$, wherein $i=\{1, \ldots, m\}$. Synaptic connectivity information for an input core circuit $Core_{1,i}$ is initialized/set using a corresponding transform $T_{1,i}$. Let $T_{2,i}$ denote a transform corresponding to an output core circuit $Core_{2,i}$, wherein $i=\{1, \ldots, m\}$. Synaptic connectivity information for an output core circuit $Core_{2,i}$ is initialized/set using a corresponding transform $T_{2,i}$.

For example, to implement a 256×256 crossbar 12 for each input core circuit 10 and output core circuit 10, two 4×4 matrices J and G satisfying relation (1) provided below are chosen:

$$JG = cH_4 \tag{1}$$

wherein $H_4$ is a 4×4 Hadamard matrix, and wherein c is a constant. A Hadamard matrix is an orthogonal matrix with particular entries that are either +1 or −1. A Hadamard matrix has maximal determinant among matrices with entries of absolute value less than or equal to 1.

For example, a 4×4 matrix J represented in form (2) shown below and a 4×4 matrix G represented in form (3) shown below satisfy relation (1):

$$J = \begin{pmatrix} -3 & 2 & 1 & -1 \\ 2 & -1 & -1 & 2 \\ 1 & -1 & 2 & 1 \\ 1 & 1 & -1 & 2 \end{pmatrix}, \text{ and} \tag{2}$$

$$G = \begin{pmatrix} -14 & -2 & -34 & -10 \\ -7 & -1 & -29 & 17 \\ 1 & 7 & -13 & 1 \\ 17 & -1 & 19 & -7 \end{pmatrix}. \tag{3}$$

A transform $T_{1,i}$ for an input core circuit $Core_{1,i}$ is defined as a column-wide concatenation of multiple Kronecker products. For example, as shown in FIG. 4, the transform $T_{1,1}$ for the input core circuit $Core_{1,1}$ is defined as a column-wide concatenation of a first Kronecker product $J \otimes A_1$ and a second Kronecker product $J \otimes A_2$, as shown in relation (4) below:

$$T_{1,1} = [J \otimes A_1, J \otimes A_2] \tag{4}$$

wherein $A_k$ is a 64×32 matrix, and $k=\{1, 2\}$. Let q represent the probability that an entry of the matrix $A_k$ is 1.

The transform $T_{1,2}$ for the input core circuit $Core_{1,2}$ is defined as a column-wise concatenation of the first Kronecker product $J \otimes A_1$ and the second Kronecker product $J \otimes A_2$, as shown in relation (5) below:

$$T_{1,2} = [J \otimes A_1 - (J \otimes A_2)] \qquad (5).$$

A matrix $A_k$ is defined as shown in relation (6) below:

$$A_k = \tilde{A}_k D \qquad (6),$$

wherein $\tilde{A}_k$ is a 64×32 binary matrix, and wherein D is a 32×32 diagonal matrix of alternative $\{1, -1\}$'s. In one embodiment, the matrix $\tilde{A}_k$ is random binary matrix comprising entries that are independent and binomially distributed. In another embodiment, the matrix $\tilde{A}_k$ is learned based on the distribution of input 105 received by the input core circuits 10 using one or more machine learning techniques.

In one embodiment, the transform architecture 150 minimizes average correlation for feature extraction. For example, the average correlation for an extracted set of features is $q^2/8$, wherein q is the probability of 1. The transform architecture 150 minimizes average correlation for feature extraction to $q^2/8$ using only four core circuits 10 (i.e., 2 input core circuits 10 and 2 output core circuits 10). The diagonal matrix D is necessary for minimizing the average correlation for a set of features extracted during feature extraction to $q^2/8$.

As described in detail later herein, the transforms $T_{1,1}$ and $T_{1,2}$ initialize/set synaptic weights of synapses 31 of the input core circuits $Core_{1,1}$ and $Core_{1,2}$, respectively, based on the matrices $A_1$ and $A_2$. Further, the transforms $T_{1,1}$ and $T_{1,2}$ initialize/set effective synaptic strengths for neurons 11 of the input core circuits $Core_{1,1}$ and $Core_{1,2}$, respectively, based on the matrix J.

A transform $T_{2,i}$ for an output core circuit $Core_{2,i}$ is defined as a row-wide concatenation of multiple Kronecker products. For example, as shown in FIG. 4, the transform $T_{2,1}$ for the output core circuit $Core_{2,1}$ is defined as a row-wide concatenation of a first Kronecker product $G \otimes B_1$ and a second Kronecker product $G \otimes B_2$, as shown in relation (7) below:

$$T_{2,1} = \begin{pmatrix} G \otimes B_1 \\ G \otimes B_2 \end{pmatrix}, \qquad (7)$$

wherein $B_p$ is a 32×64 binary matrix, and wherein $p=\{1, 2\}$.

The transform $T_{2,2}$ for the output core circuit $Core_{2,2}$ is defined as a row-wide concatenation of the Kronecker product $G \otimes B_1$ and the second Kronecker product $G \otimes B_2$, as shown in relation (8) below:

$$T_{2,2} = \begin{pmatrix} G \otimes B_1 \\ G \otimes B_2 \end{pmatrix}. \qquad (8)$$

In one embodiment, the matrix $B_p$ is random binary matrix comprising entries that are independent and binomially distributed. In another embodiment, the matrix $B_p$ is learned based on the distribution of input 105 received by the input core circuits 10 using one or more machine learning techniques. Let q represent the probability that an entry of the matrix $B_p$ is 1.

The matrix $B_p$ represents random synaptic weights. As described in detail later herein, the transforms $T_{2,1}$ and $T_{2,2}$ initialize/set synaptic weights of synapses 31 of the output core circuits $Core_{2,1}$ and $Core_{2,2}$, respectively, based on the matrices $B_1$ and $B_2$. Further, the transforms $T_{2,1}$ and $T_{2,2}$ initialize/set effective synaptic strengths for neurons 11 of the output core circuits $Core_{2,1}$ and $Core_{2,2}$, respectively, based on the matrix G.

In another embodiment, an orthogonal matrix other than a Hadamard matrix may be used instead to satisfy relation (1). For example, a 4×4 orthogonal matrix $O_4$, as represented in form (9) provided below, may be used in lieu of a 4×4 Hadamard matrix $H_4$:

$$O_4 = \begin{pmatrix} a & b & c & d \\ -b & a & -d & c \\ -c & d & a & -b \\ -d & -c & b & a \end{pmatrix}, \qquad (9)$$

wherein a, b, c and d are integers between −255 and +255.

As another example, a Cayley transform may be applied to a skew symmetric matrix S to generate an orthogonal matrix Q, wherein the orthogonal matrix Q may be used in lieu of a Hadamard matrix H. The Cayley transform produces the orthogonal matrix Q using the equation (10) provided below:

$$Q = (I-S)(I+S)^{-1} \qquad (10),$$

wherein I represent an identity matrix (i.e., a square matrix with ones on the main diagonal and zeros elsewhere). For example, the Cayley transform may be applied to an example 4×4 skew symmetric matrix $S_4$, as represented in form (11) provided below, to generate a 4×4 orthogonal matrix $Q_4$ that may be used in lieu of a 4×4 Hadamard matrix $H_4$:

$$S_4 = \begin{pmatrix} 0 & a & b & c \\ -a & 0 & d & e \\ -b & -d & 0 & f \\ -c & -e & -f & 0 \end{pmatrix}. \qquad (11)$$

If the orthogonal matrix Q is a rational-valued orthogonal matrix, the orthogonal matrix Q may be normalized to obtain an integer-valued orthogonal matrix.

A crossbar 12 implemented using either a transform $T_{1,i}$ or a transform $T_{2,i}$ may be mapped to hardware.

Figure 5:
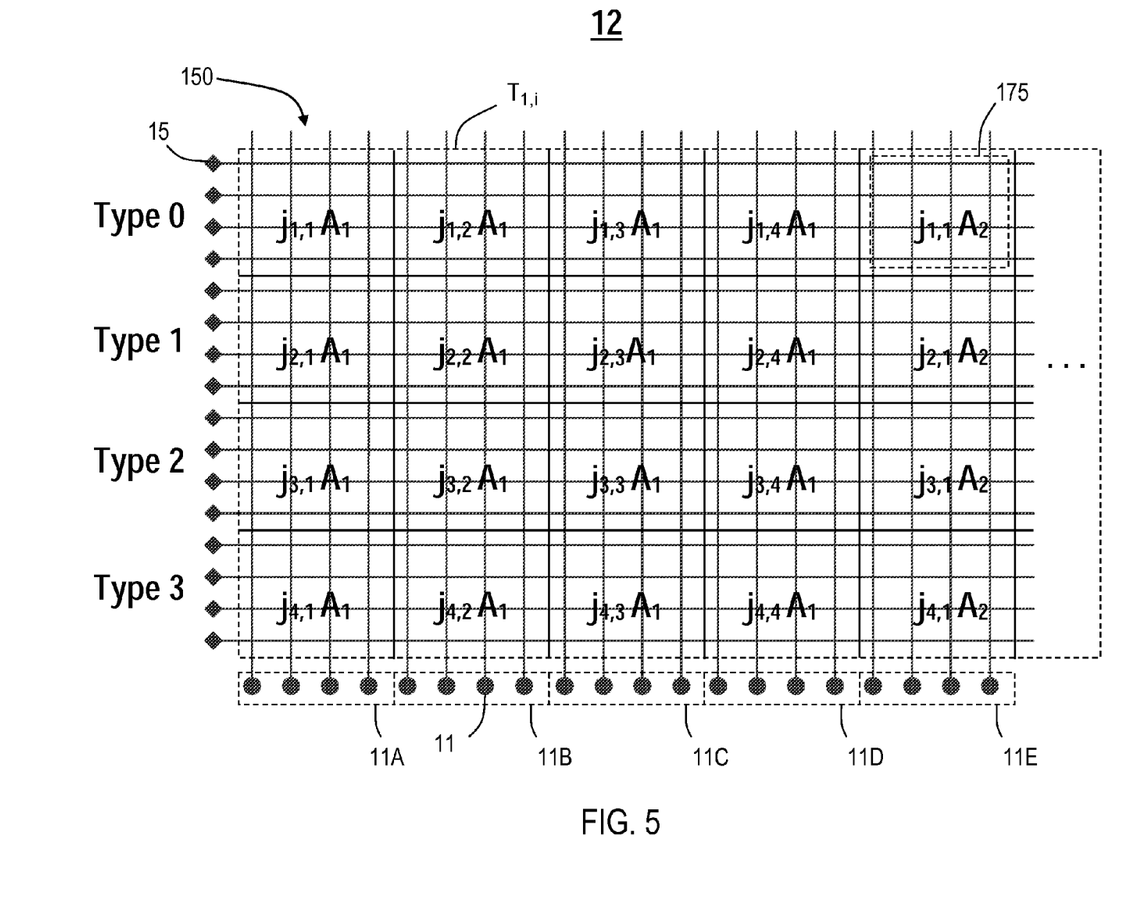
FIG. 5 illustrates a transform for a first compute phase of the transform architecture in FIG. 3, in accordance with an embodiment of the invention.

FIG. 5 illustrates a transform $T_{1,i}$ for an input core circuit 10 in FIG. 3, in accordance with an embodiment of the invention. As shown in FIG. 5, neurons 11 of an input core circuit 10 may include at least a first neuron group 11A comprising at least one neuron 11, a second neuron group 11B comprising at least one neuron 11, a third neuron group 11C comprising at least one neuron 11, a fourth neuron group 11D comprising at least one neuron 11, a fifth neuron group 11E comprising at least one neuron 11. The neurons 11 of the input core circuit 10 may include additional neuron groups.

Each entry j of the 4×4 matrix J is a scalar number that defines/sets an effective synaptic strength for at least one neuron 11 for an axon type Ty. Specifically, as shown in FIG. 5, $j_{1,1}, j_{1,2}, j_{1,3}$ and $j_{1,4}$ represent an effective synaptic strength for neurons 11 (e.g., neurons 11 of the neurons groups 11A, 11B, 11C, 11D and 11E) for the axon type Type 0. $j_{2,1}, j_{2,2}, j_{2,3}$ and $j_{2,4}$ represent an effective synaptic strength for neurons 11 for the axon type Type 1. $j_{3,1}, j_{3,2}, j_{3,3}$ and $j_{3,4}$ represent an effective synaptic strength for neurons 11 for the axon type Type 2. $j_{4,1}, j_{4,2}, j_{4,3}$ and $j_{4,4}$ represent an effective synaptic strength for neurons 11 for the axon type Type 3.

As shown in FIG. 5, the 256×256 matrix generated by the transform $T_{1,i}$ comprises multiple smaller square matrices 175, such as matrices $j_{1,1}A_1, j_{1,2}A_1, j_{1,3}A_1, j_{1,4}A_1, j_{1,1}$ $A_2, \ldots$, and $j_{4,4}A_2$. Each entry of each matrix 175 represents a value that is be combined into a membrane potential variable V of a neuron 11 when the neuron 11 receives input from an axon 15 having axon type Ty.

Specifically, each entry of each matrix $j_{1,1}A_1$, $j_{1,2}A_1$, $j_{1,3}A_1$, $j_{1,4}A_1$, $j_{1,1}A_2, \ldots, j_{1,4}A_2$ represents a value that is combined into a membrane potential variable V of a neuron 11 for the axon type Type 0. For example, each entry of the matrix $j_{1,1}A_2$ represents a value that is combined into a membrane potential variable V of a neuron 11 of the fifth neuron group 11E when the neuron 11 receives input from an axon 15 having axon type Type 0. Each entry of each matrix $j_{2,1}A_1$, $j_{2,2}A_1, j_{2,3}A_1, j_{2,4}A_1, j_{2,1}A_2, \ldots, j_{2,4}A_2$ represents a value that is combined into a membrane potential variable V of a neuron 11 for the axon type Type 1. Each entry of each matrix $j_{3,1}A_1$, $j_{3,2}A_1, j_{3,3}A_1, j_{3,4}A_1, j_{3,1}A_2, \ldots, j_{3,4}A_2$ represents a value that is combined into a membrane potential variable V of a neuron 11 for the axon type Type 2. Each entry of each matrix $j_{4,1}A_1$, $j_{4,2}A_1, j_{4,3}A_1, j_{4,4}A_1, j_{4,1}A_2, \ldots, j_{4,4}A_2$ represents a value that is combined into a membrane potential variable V of a neuron 11 for the axon type Type 3.

Figure 6:
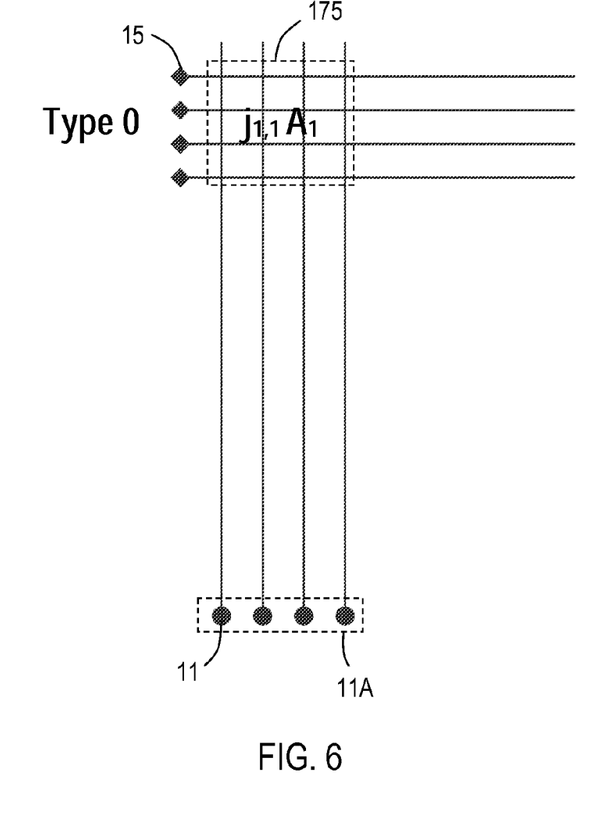
FIG. 6 illustrates a square matrix of the transform in FIG. 5, in accordance with an embodiment of the invention.

FIG. 6 illustrates a square matrix 175 of the transform $T_{1,i}$ in FIG. 5, in accordance with an embodiment of the invention. Each entry of the matrix $j_{1,1}A_1$ represents a value that is combined into a membrane potential variable V of a neuron 11 of the first neuron group 11A when the neuron 11 receives input from an axon 15 having axon type Type 0.

The matrix $A_1$ represents synaptic weights for synapses 31 interconnecting neurons 11 of the first neuron group 11A with axons 15 of Type 0.

Let $D=\text{diag}(d_1, d_2, \ldots, d_{32})$, wherein $d_k=(-1)^k$. The effective synaptic strength of an neuron 11 is set to $j_{1,1}d_i$.

Figure 7:
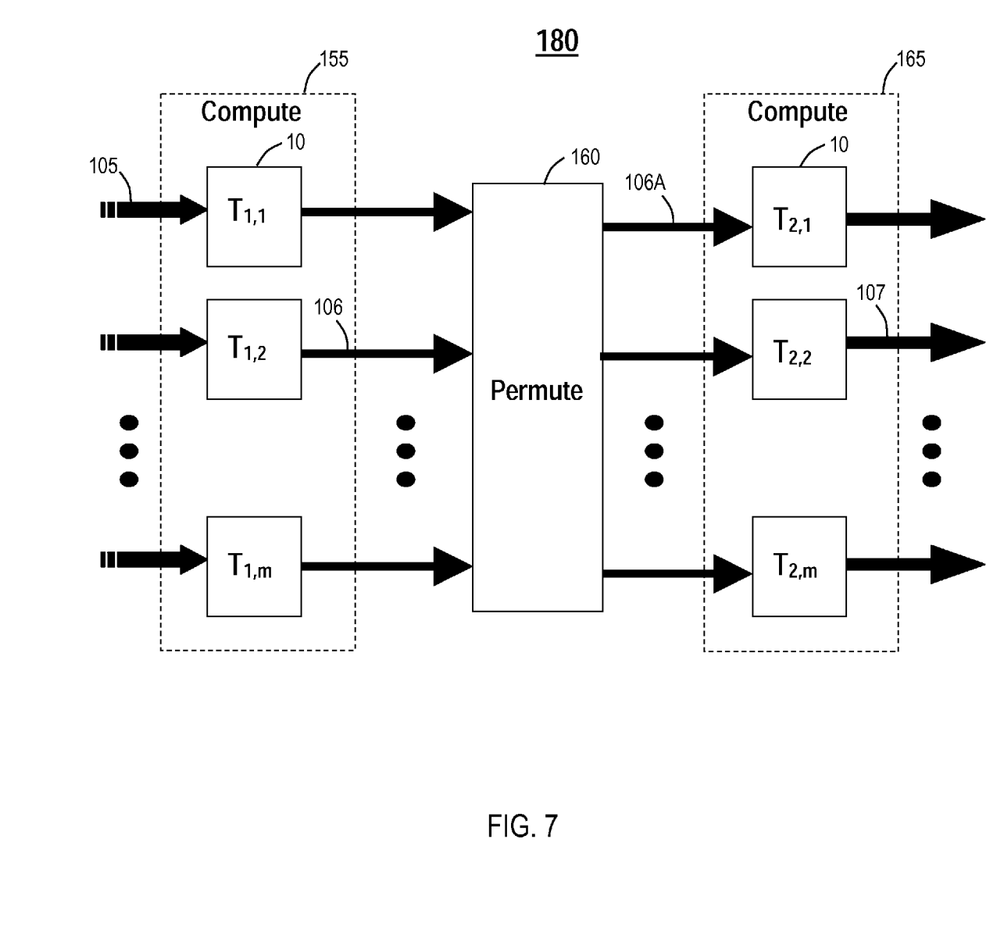
FIG. 7 illustrates another example transform architecture for multiple core circuits, in accordance with an embodiment of the invention.

FIG. 7 illustrates another example transform architecture 180 for signal processing in a neuromorphic system comprising a large number of multiple core circuits 10, in accordance with an embodiment of the invention. The core circuits 10 of the neuromorphic system may be used for feature extraction. Similar to the transform architecture 150 in FIG. 3, the transform architecture 180 is a compute-permute-compute architecture including a first compute phase 155, a permutation phase 160, and a second compute phase 165.

The core circuits 10 of the neuromorphic system are divided between the first compute phase 155 and the second compute phase 165. Each compute phase 155, 165 includes m core circuits 10, wherein m is a positive integer, and wherein $m=2^k$. Specifically, the first compute phase 155 includes m input core circuits 10 for receiving input. The second compute phase 165 includes m output core circuits 10 for outputting a set of features based on input received by the input core circuits 10. The permutation phase 160 does not require additional core circuits 10. Therefore, the transform architecture 180 utilizes a total of 2m core circuits 10.

Input 105 (e.g., incoming neuronal firing events, input from a different feature extraction layer, sensory inputs from external sensors, etc.) are assigned to axons 15 of the input core circuits 10. A neuron 11 generates an output (e.g., an outgoing neuronal firing event) when a membrane potential variable V of the neuron 11 reaches a pre-determined threshold value Th. In the permutation phase 160, output 106 generated by neurons 11 of the input core circuits 10 are permuted/reordered and routed, as permuted/reordered input 106A, to axons 15 of the output core circuits 10. Neurons 11 of the output core circuits 10 generate output 107 (e.g., outgoing neuronal firing events) based on the permuted/reordered input 106A. The output 107 may be provided to classifiers or other feature extraction layers.

In one embodiment, the input 105 comprises a set of input data. The output 106 generated by the input core circuits 10 comprises a first set of features that the input core circuits 10 extracted from the set of input data. Each feature of the first set of features is based on a subset of the set of input data. In one example implementation, the first set of features represents local features/characteristics (e.g., local characteristics for a portion of an input image). The input core circuits 10 then permute/reorder the first set of features. The permuted/reordered first set of features are routed as the permuted/reordered input 106A to the axons 15 of the output core circuits 10.

In one embodiment, the transform architecture 150 reduces average correlation for feature extraction. The output core circuits 10 generate as the output 107 a second set of features, wherein the second set of features comprises a set of features with reduced correlation. The output core circuits 10 generate the second set of features with reduced correlation by combining the permuted/reordered first set of features. Each feature of the second set of features is based on the entire set of input data. In one example implementation, the transform architecture 150 minimizes average correlation for feature extraction such that the set of features extracted is a maximally uncorrelated set of features.

In one embodiment, feature extraction comprises reducing correlation between features. The input 105 may comprise a set of input features, and the transform architecture 150 reduces average correlation the set of input features, such that the output 107 comprises a set of features with reduced correlation for the set of input features. In one example implementation, the transform architecture 150 minimizes average correlation for the set of input features such that the output 107 is a decorrelated set of features for the set of input features.

In one embodiment, each core circuit 10 includes a built-in router for permuting outgoing neuronal firing events generated by the neurons 11 of the core circuit 10. For example, the router 55 of a core circuit 10 may be further configured to permute output neuronal firing events generated by the neurons 11 of the core circuit 10.

The crossbar 12 of each core circuit 10 is implemented (i.e., constructed) based on a corresponding transform. A transform corresponding to a core circuit 10 may be used to initialize synaptic connectivity information for the core circuit 10, such as synaptic weights and effective synaptic strengths.

Let $T_{1,i}$ denote a transform corresponding to an $i^{th}$ input core circuit 10 of the first compute phase 155, wherein $i=\{1, \ldots, m\}$. For example, transform $T_{1,1}$ corresponds to a first input core circuit 10, transform $T_{1,2}$ corresponds to a second input core circuit 10, $\ldots$, and transform $T_{1,m}$ corresponds to an $m^{th}$ input core circuit 10. Synaptic connectivity information for an $i^{th}$ input core circuit 10 is initialized/set using a corresponding transform $T_{1,i}$.

Let $T_{2,i}$ denote a transform corresponding to an $i^{th}$ output core circuit 10 of the second compute phase 165, wherein $i=\{1, \ldots, m\}$. For example, transform $T_{2,1}$ corresponds to a first output core circuit 10, transform $T_{2,2}$ corresponds to a second output core circuit 10, $\ldots$, and transform $T_{2,m}$ corresponds to an $m^{th}$ output core circuit 10. Synaptic connectivity information for an $i^{th}$ output core circuit 10 is initialized/set using a corresponding transform $T_{2,i}$.

The transforms $T_{1,i}$ and $T_{2,i}$ are based on a m×m matrix J and a m×m matrix G, respectively. The matrices J and G satisfy relation (12) provided below:

$$JG=cH_m \qquad (12),$$

wherein $H_m$ is a m×m Hadamard matrix, and wherein c is a constant.

The transform $T_{1,i}$ is defined as a column-wide concatenation of multiple Kronecker products, as shown in relation (13) below:

$$T_{1,i} = [h_{i,1}(J \otimes A_{i,1}) h_{i,2}(J \otimes A_{i,2}) \ldots h_{i,m}(J \otimes A_{i,m})] \quad (13),$$

wherein $A_{i,k}$ is a 64×64/m binary matrix, wherein k={1, ..., m}, and wherein $h_{i,k}$ denotes an entry at row i and column k of the m×m Hadamard matrix $H_m$. Let q represent the probability that an entry of the matrix $A_{i,k}$ is 1.

In one embodiment, the matrix $A_{i,k}$ is random binary matrix comprising entries that are independent and binomially distributed. In another embodiment, the matrix $A_{i,k}$ is learned based on the distribution of input 105 received by the input core circuits 10 using one or more machine learning techniques.

In one embodiment, the transform architecture 180 minimizes average correlation for feature extraction. For example, the average correlation for an extracted set of features is $q^2/(4m)$, wherein q is the probability of 1. The transform architecture 180 minimizes average correlation for feature extraction to $q^2/(4m)$ using only 2m core circuits.

The transform $T_{1,i}$ initializes/sets synaptic weights of synapses 31 of the $i^{th}$ input core circuit 10 based on the matrices $A_{i,1}, A_{i,2}, \ldots,$ and $A_{i,m}$. Further, the transform $T_{1,i}$ initialize/set effective synaptic strengths for neurons 11 of the $i^{th}$ input core circuit 10 based on the matrix J.

The transform $T_{2,i}$ is defined as a row-wide concatenation of multiple Kronecker products, as shown in relation (14) below:

$$T_{2,i} = \begin{pmatrix} G \otimes B_{i,1} \\ G \otimes B_{i,2} \\ \vdots \\ G \otimes B_{i,m} \end{pmatrix}, \quad (14)$$

wherein $B_{i,k}$ is a 64/m×64 binary matrix, and wherein k={1, ..., m}. Let q represent the probability that an entry of the matrix $B_{i,k}$ is 1.

In one embodiment, the matrix $B_{i,k}$ is random binary matrix comprising entries that are independent and binomially distributed. In another embodiment, the matrix $B_{i,k}$ is learned based on the distribution of input 105 received by the input core circuits 10 using one or more machine learning techniques.

The matrix $B_{i,k}$ represents random synaptic weights. The transform $T_{2,i}$ initializes/sets synaptic weights of synapses 31 of the $i^{th}$ output core circuit 10 based on the matrices $B_{i,1}, B_{i,2}, \ldots,$ and $B_{i,m}$. Further, the transform $T_{2,i}$ initialize/set effective synaptic strengths for neurons 11 of the $i^{th}$ output core circuit 10 based on the matrix G.

In another embodiment, an m×m orthogonal matrix other than the m×m Hadamard matrix $H_m$ may be used instead to satisfy relation (12).

Figure 8:
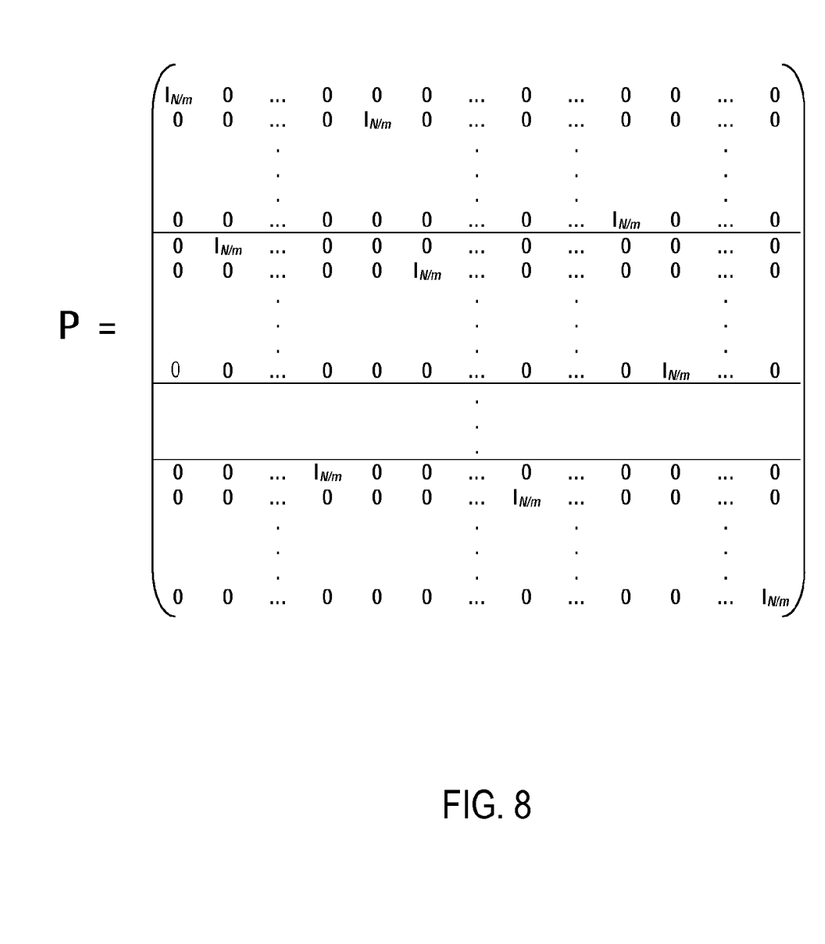
FIG. 8 illustrates an example permutation matrix for the permutation phase of the transform architecture in FIG. 7, in accordance with an embodiment of the invention.

FIG. 8 illustrates an example permutation matrix P for the permutation phase 160 of the transform architecture 180 in FIG. 7, in accordance with an embodiment of the invention. Let matrix P represent a permutation of output 106 (e.g., outgoing neuronal firing events) generated by the neurons 11 of the input core circuits 10. Let N represent the size of the synaptic crossbar 12 of each input core circuit 10. Let m represent the number of core circuits 10 in each compute phase 155, 165. Let I represent an identity matrix. In one embodiment, N is 256 (i.e., the synaptic crossbar 12 of each input core circuit 10 is 256×256).

As stated above, each core circuit 10 includes a built-in router configured to permute output 106 generated by neurons 11 of the core circuit 10. The built-in router of each input core circuit 10 is configured to permute output 106 based on the matrix P.

Figure 9:
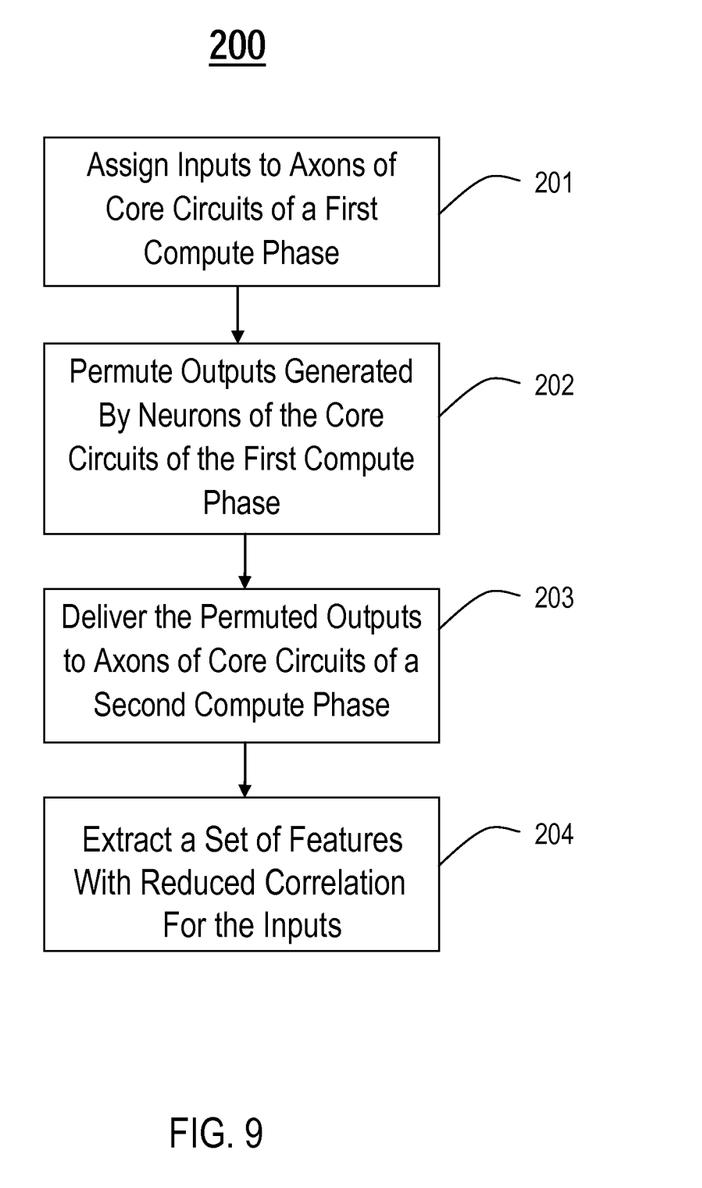
FIG. 9 illustrates a flowchart of an example process for feature extraction in a neuromorphic system comprising multiple core circuits.

FIG. 9 illustrates a flowchart of an example process 200 for feature extraction in a neuromorphic system comprising multiple core circuits, in accordance with an embodiment of the invention. In process block 201, assign all inputs to axons of core circuits of a first compute phase. In process block 202, permute outputs generated by neurons of the core circuits of the first compute phase. In process block 203, deliver the permuted outputs to axons of core circuits of the second compute phase. In process block 204, extract a set of features with reduced correlation for the inputs.

Figure 10:
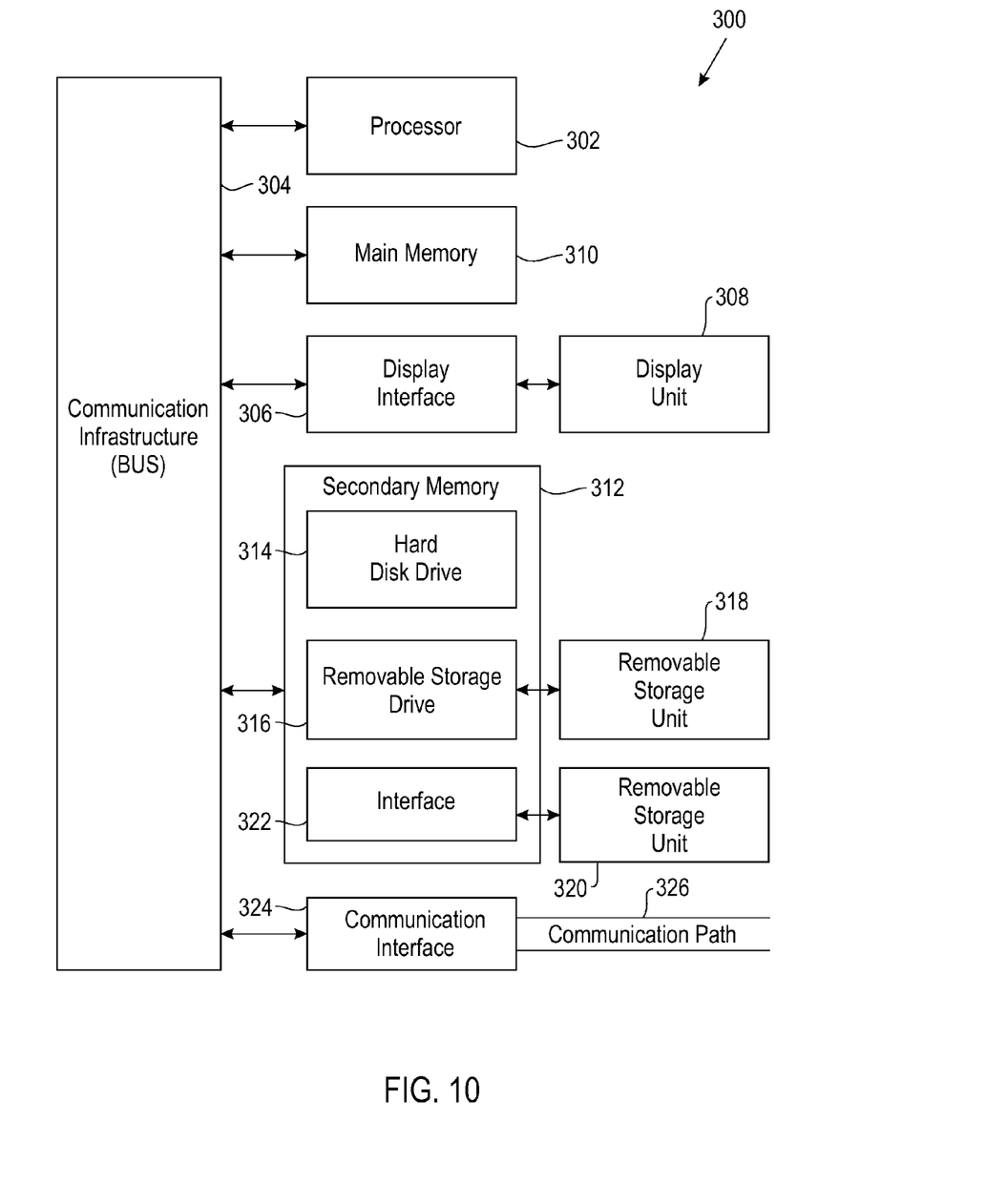
FIG. 10 is a high level block diagram showing an information processing system useful for implementing one embodiment of the present invention.

FIG. 10 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for hierarchical routing and two-way information flow with structural plasticity in neural networks. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for feature extraction using multiple neurosynaptic core circuits including one or more input core circuits for receiving input and one or more output core circuits for generating output, comprising:
   receiving a set of input data via said one or more input core circuits;
   extracting a first set of features from said set of input data using said one or more input core circuits, wherein each feature of said first set of features is based on a subset of said set of input data;
   reordering said first set of features using said one or more input core circuits; and
   generating a second set of features by combining said reordered first set of features using said one or more output core circuits, wherein said second set of features comprises a set of features with reduced correlation, and wherein each feature of said second set of features is based on the entirety of said set of input data.

2. The method of claim 1, wherein:
said first set of features is extracted from said set of input data based on corresponding synaptic connectivity information for said one or more input core circuits.

3. The method of claim 2, wherein:
for each of said one or more input core circuits, corresponding synaptic connectivity information for said input core circuit is based on a column-wide concatenation of multiple Kronecker products.

4. The method of claim 1, wherein:
said reordered first set of features are combined based on corresponding synaptic connectivity information for said one or more output core circuits.

5. The method of claim 4, wherein:
for each of said one or more output core circuits, corresponding synaptic connectivity information for said output core circuit is based on a row-wide concatenation of multiple Kronecker products.

6. The method of claim 1, wherein:
each core circuit comprises one or more electronic neurons, one or more electronic axons, and a plurality of synapse devices for interconnecting said one or more electronic neurons with said one or more electronic axons.

7. The method of claim 6, wherein
each core circuit further comprises a built-in router for reordering said first set of features.

8. The method of claim 1, wherein:
the number of input core circuits included in said multiple core circuits is the same as the number of output core circuits included in said multiple core circuits.

9. The method of claim 1, wherein:
said set of input data comprises multiple input features; and
said feature extraction comprises reducing correlation between said multiple input features, such that said second set of features represents a set of features with reduced correlation for said multiple input features.

10. A neuromorphic system for feature extraction, comprising:
   a first set of neurosynaptic core circuits for:
      receiving a set of input data;
      extracting a first set of features from said set of input data, wherein each feature of said first set of features is based on a subset of said set of input data; and
      reordering said first set of features; and
   a second set of neurosynaptic core circuits for:
      generating a second set of features by combining said reordered first set of features, wherein said second set of features comprises a set of features with reduced correlation, and wherein each feature of said second set of features is based on the entirety of said set of input data.

11. The neuromorphic system of claim 10, wherein:
said first set of features is extracted from said set of input data based on corresponding synaptic connectivity information for said first set of neurosynaptic core circuits.

12. The neuromorphic system of claim 10, wherein:
for each neurosynaptic core circuit of said first set of neurosynaptic core circuits, corresponding synaptic connectivity information for said neurosynaptic core circuit is based on a column-wide concatenation of multiple Kronecker products.

13. The neuromorphic system of claim 10, wherein:
said reordered first set of features are combined based on corresponding synaptic connectivity information for said second set of neurosynaptic core circuits.

14. The neuromorphic system of claim 13, wherein:
for each neurosynaptic core circuit of said second set of neurosynaptic core circuits, corresponding synaptic connectivity information for said neurosynaptic core circuit is based on a row-wide concatenation of multiple Kronecker products.

15. The neuromorphic system of claim 10, wherein:
each neurosynaptic core circuit comprises one or more electronic neurons, one or more electronic axons, and a plurality of synapse devices for interconnecting said one or more electronic neurons with said one or more electronic axons.

16. The neuromorphic system of claim 15, wherein:
each neurosynaptic core circuit further comprises a built-in router for reordering said first set of features.

17. The neuromorphic system of claim 10, wherein:
said first set of neurosynaptic core circuits has the same number of neurosynaptic core circuits as said second set of neurosynaptic core circuits.

18. The neuromorphic system of claim 10, wherein:
said set of input data comprises multiple input features; and
said feature extraction comprises reducing correlation between said multiple input features, such that said second set of features represents a set of features with reduced correlation for said multiple input features.

19. A computer program product for feature extraction using multiple neurosynaptic core circuits including one or more input core circuits for receiving input and one or more output core circuits for generating output, the computer program product comprising a computer-readable storage medium having program code embodied therewith, the program code being executable by a computer to:
receive a set of input data via said one or more input core circuits;
extract a first set of features from said set of input data using said one or more input core circuits, wherein each feature of said first set of features is based on a subset of said set of input data;
reorder said first set of features using said one or more input core circuits; and
generate a second set of features by combining said reordered first set of features using said one or more output core circuits, wherein said second set of features comprises a set of features with reduced correlation, and wherein each feature of said second set of features is based on the entirety of said set of input data.

20. The computer program product of claim 19, wherein:
said set of input data comprises multiple input features; and
said feature extraction comprises reducing correlation between said multiple input features, such that said second set of features represents a set of features with reduced correlation for said multiple input features.

* * * * *